No. 764,018. PATENTED JULY 5, 1904.
C. A. G. STORZ.
HOSE PIPE COUPLING.
APPLICATION FILED NOV. 19, 1900.
NO MODEL.
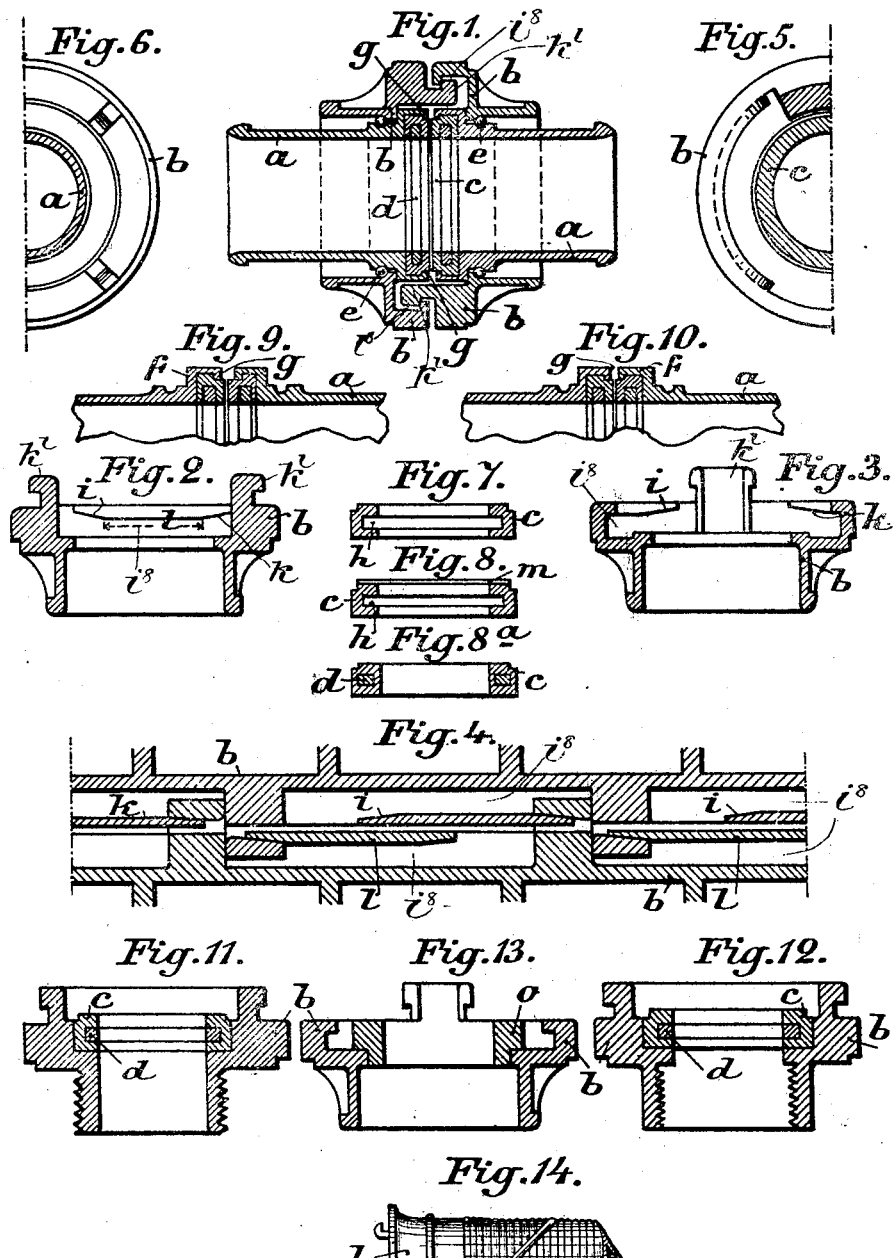

No. 764,018.

Patented July 5, 1904.

UNITED STATES PATENT OFFICE.

CARL AUGUST GUIDO STORZ, OF FRANKFORT-ON-THE-MAIN, GERMANY.

HOSE-PIPE COUPLING.

SPECIFICATION forming part of Letters Patent No. 764,018, dated July 5, 1904.

Application filed November 19, 1900. Serial No. 36,976. (No model.)

*To all whom it may concern:*

Be it known that I, CARL AUGUST GUIDO STORZ, engineer, a subject of the German Emperor, residing at Zeil 63, Frankfort-on-the-Main, Germany, have invented a certain new and useful Improvement in Hose-Pipe Couplings, of which the following is a full, clear, concise, and exact description, reference being had to the accompanying drawings, forming a part of this specification.

My invention relates to hose-couplings, and more particularly to bayonet hose-couplings used both for fire and industrial purposes, and has for its object the provision of an improved coupling of this character whose adjoining coupling ends are preferably similarly constructed and which does not require such extreme accuracy in construction, whereby it may be easily and readily manufactured.

In couplings as previously constructed the engaging projections of the coupling ends must necessarily be constructed with extreme care, so as to have the exact height for which they are designed, because an engaging projection which by faulty construction is not made of the exact requisite height will increase the danger of self-opening of the coupling and also injuriously influence the airtight properties of the joint. It is furthermore essential that the height of the projecting coupling ends be not more than two millimeters, as otherwise the resistance of the elastic ring employed must be overcome by hand, and this is generally too great with such a height. It must also be borne in mind that hose-couplings are frequently manufactured at different shops, which is more particularly the case with hose-couplings used for fire-department purposes, and as these must fit accurately together, as would be the case if smaller village and town fire-departments, which depend upon help from neighboring fire-departments when a large fire breaks out, interchange lengths of hose-sections during the continuance of the fire. The maintenance of this requirement is so much harder, as structural errors enter more largely into those bayonet-couplings which are particularly adapted for use by fire-departments, thereby increasing the difficulty of securing a tight joint. With reference to what has been stated, as experience has shown, the manufacture of exactly similar halves for bayonet-couplings has been hitherto practically impossible, due to the extreme difficulty of securing inclined coupling-surfaces of exactly the same height, and as the cost of manufacture has already been so materially increased in order to secure approximately the same heights of the couplings there is a large demand for a construction to overcome these objections, which construction forms the basis of the present invention. A further requirement for such couplings is that they must be adapted both for pressure and vacuum purposes, as their use for both purposes is essential both in fire-departments and also commercial enterprises. Moreover, the manufacture and maintenance of separate and distinct pressure and vacuum couplings not only increases the cost of manufacture and sale, but also makes it difficult for the purchaser and frequently leads to errors. To accomplish this object, it is necessary to obtain a suitable packing-ring which may automatically act in the double capacity required, as the packing-rings which had hitherto been employed to accomplish these objects were insecure against a high vacuum and a high pressure and as it was also impossible to satisfactorily couple and uncouple hose-sections of the required size for use in fire-departments, but only to couple small hose-sections by means of bayonet-sockets.

As experience has shown, another undesirable feature of present bayonet hose-couplings resides in the fact that the inclines of the coupling-surfaces are sometimes too steep and sometimes too flat, in which latter case the coupling under some circumstances may uncouple itself, while if the inclines are too steep trouble is experienced in satisfactorily uncoupling the sections when once united. Furthermore, the cost of manufacture is greatly increased, as the engaging coupling-surfaces are generally constructed in the form of a screw-threaded surface.

My invention has for its objects, among others, the following: first, the provision of means for the ready manufacture of a suitable tight practical bayonet-coupling for fire-departments and industrial purposes; second, the provision of a simple and effective ring to be used for the double purpose of pressure and vacuum hose, which may operate automatically and which while being proof against wear to a large extent is still soft enough to be readily compressed by hand in coupling and uncoupling bayonet-couplings; third, the construction of a simple, cheap, and effective construction for inclined surfaces for bayonet-couplings which shall be guaranteed against self-uncoupling.

Further objects and advantages of my invention will be apparent from the construction of several embodiments thereof, which I will now describe in connection with the accompanying drawings, in which—

Figure 1 is a longitudinal sectional view of a coupling, showing two hose-sections united thereby. Fig. 2 is a transverse section through the coupling-ring and the bayonet-catch, showing a front view of the engaging coupling-surfaces. Fig. 3 is a transverse sectional view through the coupling-ring and the inclined surface, showing an interior view of the oblong catch. Fig. 4 is a developed view of a portion of the coupling-ring and shows the engagement of the bayonet-catch upon the inclined surface, as also the longitudinal side view of the coupling and bayonet-catch surfaces. Figs. 5 and 6 are respectively front and back views of the coupling-ring. Figs. 7, 8, and 8ª show the section of the improved rubber packing-rings for pressure and vacuum hose both with and without the auxiliary metal compensating rings. Figs. 9 and 10 show the washer-rings in the coupled and uncoupled positions of the coupling. Figs. 11 and 12 are sections through the coupling-fitting for stand-pipe and the like. Fig. 13 is a section through the coupling-gage for standardizing the coupling and ascertaining differences between the depths of the couplings. Fig. 14 is an elevation of a hose with the coupling-piece for this section.

The coupling consists, essentially, of hose-sections $a$, the coupling-rings $b$, the flexible packing-rings $c$, the compensating metal rings $d$, and the spring-engaging ring $e$ for holding the coupling-ring upon the hose section or union. In order to cheaply manufacture this coupling, I prefer to mount the packing-ring $c$ in a groove $f$ and associate therewith a ring $d$, constructed, preferably, of metal or other hard material. To accommodate the compensating ring $d$, the packing-ring $c$ is provided with a deep annular groove $h$, into which said compensating ring is placed before the packing-ring $c$ is pressed into position inside of the coupling $a$.

Owing to different structural conditions defects are unavoidably present, which cause the engaging coupling-surfaces to be of various unequal heights, and in order to adjust each coupling for its specific defects, which are due to faulty manufacture, I construct the compensating rings in a number of sizes having different widths. Each coupling-half is brought into engagement with a standard-gage coupling-half, as shown in Fig. 13, containing a ring $o$ of standard height, and if it is found that the axial dimensions of the coupling-surfaces of the coupling-half being tested are too large a compensating ring of smaller width is inserted in the packing-ring, or, if the coupling-surfaces are found too small, a compensating ring of larger width is inserted. It is possible in this manner to compensate for inequalities up to two millimeters, as the groove $h$, which is provided in the packing-ring $c$, is quite deep in proportion to the depth of the ring, and thus the said packing-ring may readily be distended as much as one millimeter. Thus structural errors which may occur in even the most careless construction may be compensated for in a cheap and effective manner while still retaining the requisite engaging-surface of the packing-ring. This advantage was not present in constructions hitherto employed, even with an increased cost of manufacture, and I obtain this improved construction by means of the use of my improved metal compensating ring $d$, which acts in coöperation with the specially-constructed packing-ring $c$, adapted to receive the same.

My improved coupling is also adapted for the double use of pressure and vacuum purposes, inasmuch as the metal compensating ring serves to press outwardly against the packing-ring $c$, and thus retain the same in position to overcome any external pressure which may be brought to bear against the said packing-ring, as would be the case when the same were used for vacuum purposes. The use of this ring does not in any way retard or affect the ease with which the coupling may be coupled or uncoupled by hand and at the same time does not injuriously influence the elasticity of the rubber packing-ring. I attain these objects preferably by the use of a compensating ring of substantially a massive construction which serves, therefore, to guard against displacement of the packing-ring $c$ even with a high vacuum in the interior of the hose and also for the reason that the said compensating ring is yieldingly supported by the said packing-ring, whereby the elasticity of the said packing-ring is not destroyed, so that the yielding movement thereof longitudinally of the hose is permitted, whereas in all prior constructions such yielding longitudinal movement was impossible.

Another important and distinguishing feature of my invention over those of the prior art consists in providing within the packing-ring $c$ a groove which is of such depth as almost to reach to the outer coupling-ring, which groove is perpendicular relative to the axis of the coupling and by virtue of which only a small amount of connecting elastic material is allowed between the two portions of the rubber packing-ring on either side of the said groove. The insertion of the compensating ring within this groove, which ring fills the entire annular space thereof, makes it possible that the said coupling-ring may be only provided with a very slight groove in order to retain said packing-ring in place, which is a further advantage, as said rings may thereby be easily and most effectively inserted within the unions. The packing-rings of these couplings are therefore rapidly, securely, and easily inserted in the union $a$ by hand without the necessity of tools.

A further advantage of the bayonet-coupling packing-ring constructed in this manner is due to the use of substantially two rings, which nevertheless are united by means of a thin strip extending back of the compensating ring $d$, thus securing a most effective yielding connection, as the packing-rings hitherto employed consisted of a heavy mass which was not readily compressible. In consideration of the above, inasmuch as the packing-rings hitherto employed having their flat side parallel to the axis of the coupling and being held in place by split-metal bands were not proof against a high vacuum and were in other respects altogether unsatisfactory for larger sizes of hose and inasmuch as no particular tools are necessary to manipulate or repair hose-couplings constructed in accordance with this invention, the same presents a most radical departure from the construction and action of the constructions hitherto employed for pressure and vacuum hose.

In regard to the coupling mechanism and the coupling-surfaces for this coupling it is furthermore to be pointed out that experience has shown that in order to obtain a secure and effective joint and one which will not of itself uncouple it is necessary that such surface have a length of at least six to seven centimeters and that in hose used for fire-extinguishing purposes and in other similar cases it is necessary in addition thereto to provide a further guard against uncoupling. As said catches or hooks can be advantageously used in this connection, this further guard against uncoupling can only be obtained by means of the engaging coupling-surfaces which are inclined downwardly toward the inner ends of the coupling-surfaces $k$. Bearing in mind that a sufficient incline of the coupling-surface must be maintained, the possibility of using such a sufficient incline is made difficult by the fact that the length of the coupling-surface must be six to seven centimeters and that the thickness or depth of the coupling-hooks or bayonet-catches must not be above two millimeters. The sectional screw-surfaces hitherto used in such couplings having a sufficient length of coupling-surface do not permit of an incline of more than three to five per cent. As such a small incline, however, prevents the couplings from uncoupling of themselves only when very accurately constructed, but not when two couplings with smaller depth are used, and, moreover, as the use of such surfaces—that is, screw-surfaces—for coupling materially increases the cost, it is of primary importance to overcome this objection in couplings of this sort. To accomplish this object, the coupling-surfaces $l$, which are associated with the coupling-rings $b$, are made flat in the present invention and are only provided at the front end of said coupling-surface $l$ and at the end thereof $k$ with a slight inclination, Figs. 1, 2, 3, and 4. The slight inclination $k$ provided at the rear end of the coupling-surface $l$ is adapted to form the actual coupling-surface and act as guard against uncoupling. To attain a sufficient incline of the surface toward the end of the surface $k$, the decline of the latter is not made any longer than the breadth of the coupling-hook—that is, just wide enough to permit the coupling-hook $k'$ to rest thereon. The incline $i$ at the front end of the coupling-surface $l$ is then also constructed only of such length as is absolutely necessary. As is apparent from this, such a coupling-surface permits of the use of a percentage of decline of the coupling-surface which is doubled or even trebled by means of the decrease of the coupling-surface $k$, which is the surface which is adapted to guard against the uncoupling of the portions of said coupling of themselves without overstepping the bounds of two millimeters allowed as the depth of the bayonet-catches. Hereby the safety of such couplings is very materially increased, and they are absolutely secure. The advantage thus obtained hereby is so much the more valuable, as experience has shown that the percentage of decline may be increased to a pitch of ten or fifteen per cent. without materially increasing the trouble consequent upon coupling. Moreover, by means of using the flat surface which has inclined sections at its ends it is possible to construct a coupling much more cheaply than is the case in constructions of the prior art, in which screw-surfaces are used. Moreover, the tools required to manufacture the same are of a much simpler nature, and thus require a smaller installation of machines.

A further advantage of coupling-surfaces of this character resides in the fact that they are subject to less wear, as the wearing-surfaces do not engage, as in the case of screw-surfaces, where sharp surfaces coming in contact tend to wear each other away very rapidly. The advantages, therefore, of this new construction, whereby couplings are so constructed that they cannot of themselves uncouple and whereby their wear in actual service is materially decreased, will be very apparent and will distinguish them markedly from the constructions hitherto employed in bayonet hose-coupling. In hose of small diameter, such as is used for garden purposes, one of the inclined surfaces may be left and only an inclined surface be provided at the front end of the coupling-surface—namely, the surface $i$—while if packing-rings are used in hose of larger diameter which are harder and less yielding than those ordinarily employed the percentage of incline of these surfaces may be decreased and the same made longer, if desired.

To correctly handle the coupling of the present invention, it must be borne in mind that the coupling is effected by simply moving the coupling-hook $k'$ into the coupling-ring groove $i^3$ and the guide-surface $i$ as well as by turning the coupling-ring $b$ up to the stop provided at the end of the coupling-surface $l$ at the side thereof. The uncoupling of the coupling is accomplished by the reverse operation. The depth of the coupling is so arranged that the momentary maximum contraction of the rubber ring $c$ while the coupling-hook $k'$ is sliding over the central coupling-surface $l$ is three millimeters and the additional compression of the ring $c$, which is required at the end to complete the coupling, is equal to an additional half, which space is equivalent to the depth to which the coupling-hooks $k'$ fall by engaging the short safety coupling-surface $k$ after a complete coupling has been effected. In view of the fact that the coupling cannot move toward the opening thereof $i^3$ on account of the fifteen-per-cent. incline of the coupling-surface without compressing by half the packing-ring, which is already compressed about three millimeters, and as this may only be done by hand, and also in view of the fact that structural errors due to different depths of the coupling-hook may be compensated for in this coupling by means of a compensating ring $d$, it will be apparent that this coupling is almost absolutely guaranteed against uncoupling itself. The cross-section of the compensating ring $d$ of this coupling may, although the rectangular form which permits of a smooth passage of water therethrough is herein shown, be constructed of other shapes—as, for instance, in hose-couplings that are designed merely for use under high pressure the same may be curved or chamfered or rounded on the inner side thereof to aid in strengthening the automatic action of the packing-ring. Furthermore, it is apparent that the said ring may be completely embedded in the packing-ring $d$, as is apparent from Fig. 8.

Attention is furthermore directed to the fact that while the construction of the locking mechanism of this coupling is, as shown in the figures, by means of the so-called "closed" bayonet-lock it will be apparent that the packing and compensating rings, as well as the coupling-surfaces, are capable of such a construction as to be adapted for use with the so-called "open" bayonet-lock and in connection with couplings in which two adjacent ends are not exactly equal. Furthermore, the coupling-rings may be, if desired, mounted loosely or fixedly upon the hose sections or unions.

Having now particularly described and ascertained the nature of my said invention and the manner in which the same is to be performed, I declare that what I claim is—

1. In a bayonet-joint coupling for hose-pipes and the like, the combination with each hose-pipe union, of a washer-ring having an internal deep groove between its front and back surfaces, and of a compensating and strengthening ring of hard material fitted in said groove, the cross-section of the groove and of the hard ring being wider in radial than in axial direction, substantially as described and for the purpose set forth.

2. In a bayonet-joint coupling for hose-pipes and the like, the combination with each hose-pipe union, of a washer-ring having an internal deep groove between its front and back surfaces, of a compensating and strengthening ring of hard material fitted in said groove, the cross-section of the groove and of the hard ring being wider in radial than in axial direction, of coupling-hooks and of coupling-webs the surfaces of which are horizontal except at the beginning and end thereof, where they are inclined, substantially as described and for the purpose set forth.

In witness whereof I hereunto subscribe my name this 29th day of October, A. D. 1900.

CARL AUGUST GUIDO STORZ.

Witnesses:
CARL SCHAFER,
JEAN GRUND.